(12) United States Patent
Nishigaki

(10) Patent No.: US 11,759,898 B2
(45) Date of Patent: Sep. 19, 2023

(54) METHOD FOR SETTING BOTTOM-TOUCHING-DETERMINATION STANDARD AND NON-TRANSITORY COMPUTER READABLE STORAGE MEDIUM

(71) Applicant: OMRON Corporation, Kyoto (JP)

(72) Inventor: Koji Nishigaki, Kusatsu (JP)

(73) Assignee: OMRON Corporation, Kyoto (JP)

( * ) Notice: Subject to any disclaimer, the term of this patent is extended or adjusted under 35 U.S.C. 154(b) by 258 days.

(21) Appl. No.: 17/278,324

(22) PCT Filed: Sep. 25, 2019

(86) PCT No.: PCT/JP2019/037510
§ 371 (c)(1),
(2) Date: Mar. 21, 2021

(87) PCT Pub. No.: WO2020/090293
PCT Pub. Date: May 7, 2020

(65) Prior Publication Data
US 2021/0346995 A1 Nov. 11, 2021

(30) Foreign Application Priority Data
Oct. 29, 2018 (JP) ................. 2018-203048

(51) Int. Cl.
*B23P 19/06* (2006.01)
*G01L 3/14* (2006.01)
*G01L 5/24* (2006.01)

(52) U.S. Cl.
CPC .......... *B23P 19/066* (2013.01); *G01L 3/1464* (2013.01); *G01L 5/24* (2013.01); *G01L 5/246* (2013.01)

(58) Field of Classification Search
CPC ........ B23P 19/066; G01L 3/1464; G01L 5/24; G01L 5/246
See application file for complete search history.

(56) References Cited

U.S. PATENT DOCUMENTS 4,620,450 A * 11/1986 Yamaguchi ............. B25B 23/14
73/761
5,469,924 A * 11/1995 Kanamori ............... B25B 23/14
173/176
(Continued)

FOREIGN PATENT DOCUMENTS

| CN | 103240586 | 8/2013 |
|---|---|---|
| CN | 103364129 | 10/2013 |

(Continued)

OTHER PUBLICATIONS

"Search Report of Europe Counterpart Application", dated Aug. 30, 2022, p. 1-p. 7.
(Continued)

*Primary Examiner* — Ryan J. Walters
(74) *Attorney, Agent, or Firm* — JCIPRNET

(57) ABSTRACT

Provided is a method for setting bottom-touching-determination standard capable of setting a bottom-touching-determination standard based on parameters with high reliability. The method for setting bottom-touching-determination standard includes a screwing step of screwing a measurement screw (11) into a measurement screw hole (13a), a parameter acquisition step of acquiring parameters in the screwing step, a bottom-touching-determination step of determining the presence or absence of bottom-touching on the basis of an axial force of the measurement screw, and a determination standard setting step of collating the determination result in the bottom-touching-determination step and the parameters to set the bottom-touching-determination standard.

2 Claims, 4 Drawing Sheets

(56) References Cited

U.S. PATENT DOCUMENTS

| | | | | |
|---|---|---|---|---|
| 5,549,169 | A * | 8/1996 | Matsumura | B23P 19/06 173/176 |
| 9,370,848 | B2 * | 6/2016 | Harada | B23P 19/06 |
| 11,478,887 | B2 * | 10/2022 | Suzuki | B23P 19/06 |
| 2001/0037550 | A1 * | 11/2001 | Shoberg | G01L 5/24 29/407.03 |
| 2003/0011275 | A1 | 1/2003 | Nasrollahzadeh | |
| 2009/0013518 | A1 | 1/2009 | Monville | |
| 2011/0185864 | A1 * | 8/2011 | Ide | B25B 21/00 81/479 |
| 2013/0067711 | A1 | 3/2013 | Harada | |
| 2017/0082510 | A1 | 3/2017 | Futai | |

FOREIGN PATENT DOCUMENTS

| | | |
|---|---|---|
| CN | 105606289 | 5/2016 |
| CN | 106457537 | 2/2017 |
| CN | 108458825 | 8/2018 |
| EP | 1764596 | 3/2007 |
| JP | H04329329 | 11/1992 |
| JP | H07223132 | 8/1995 |
| JP | 2004093377 | 3/2004 |
| JP | 2004291217 | 10/2004 |
| JP | 2011073105 | 4/2011 |
| JP | 2013059816 | 4/2013 |
| JP | 6291609 | 3/2018 |
| KR | 101842048 | 5/2018 |

OTHER PUBLICATIONS

"Office Action of China Counterpart Application" with English translation thereof, dated Dec. 21, 2021, p. 1-p. 13.

"International Search Report (Form PCT/ISA/210) of PCT/JP2019/037510", dated Dec. 17, 2019, with English translation thereof, pp. 1-4.

"Written Opinion of the International Searching Authority (Form PCT/ISA/237) of PCT/JP2019/037510", dated Dec. 17, 2019, with English translation thereof, pp. 1-6.

* cited by examiner

| screwed length | L1 | L2 |
|---|---|---|
| lower limit of axial force at which it is determined that no bottom-touching has occurred | F1 | F2 |

METHOD FOR SETTING BOTTOM-TOUCHING-DETERMINATION STANDARD AND NON-TRANSITORY COMPUTER READABLE STORAGE MEDIUM

CROSS-REFERENCE TO RELATED APPLICATION

This application is a 371 application of the international PCT application serial no. PCT/JP2019/037510, filed on Sep. 25, 2019, which claims the priority benefit of Japan application no. 2018-203048, filed on Oct. 29, 2018. The entirety of each of the above-mentioned patent applications is hereby incorporated by reference herein and made a part of this specification.

BACKGROUND

Technical Field

The disclosure relates to a method for setting bottom-touching-determination standard used to determine a bottom-touching defect in screw tightening.

Related Art

If a float such as bottom-touching occurs when screws are tightened by a screw tightening device, no axial force is generated, so that an appropriate fastening force cannot be obtained. If there is a gap between the bearing surface of the screw and the object to be fastened, it can be detected that bottom-touching has occurred, but sometimes bottom-touching occurs even when there is no gap between the bearing surface of the screw and the object to be fastened. Such bottom-touching can be detected by measuring the axial force of the screw.

Patent literature 1 discloses a nut runner with an axial force meter. The nut runner with an axial force meter includes a probe having a vibration generator that vibrates the bolt head vertically by an electromagnetic force and a vibration detector that detects the vertical vibration, converts the vibration into a signal and outputs the signal. The nut runner with an axial force meter generates vibration in the bolt by the vibration generator, detects the vibration with the vibration detector, processes the detection signal with a control device to calculate the resonance frequency, and makes an association with the bolt axial force (bolt tightening force).

LITERATURE OF RELATED ART

Patent Literature

Patent Literature 1: Japanese Patent Publication "Japanese Patent Laid-open No. 2004-291217 (published on Oct. 21, 2004)"

SUMMARY

Problems to be Solved

However, because the nut runner with an axial force meter disclosed in Patent literature 1 includes a probe for measuring the axial force, there is a problem that the number of parts and the cost increase as compared with a normal nut runner. In order to determine the presence or absence of bottom-touching without increasing the number of parts and the cost of the nut runner, it is preferable that bottom-touching can be detected according to parameters based on measured values obtained in a normal nut runner without an axial force meter.

In addition, in the approach disclosed in Patent literature 1, the vibration generator generates vibration in the bolt, the vibration is detected by the vibration detector, the detection signal is processed by the control device to calculate the resonance frequency, and an associating is made with the bolt axial force to thereby measure the axial force. In this case, because the axial force is indirectly measured, the precision of the measurement result is low and there is a possibility of erroneous determination.

One aspect of the disclosure aims to provide a method for setting bottom-touching-determination standard which is capable of setting a bottom-touching-determination standard based on parameters with high reliability.

Means to Solve Problems

In order to solve the above problems, the method for setting bottom-touching-determination standard according to one aspect of the disclosure sets a standard for determining bottom-touching in screw tightening. In the method, a measuring system is used which includes a screw hole member having a measurement screw hole of a predetermined depth and an axial force measuring device that measures a compressive force applied between the screw hole member and a bearing surface of a measurement screw screwed into the measurement screw hole. The method includes: a screwing step of screwing the measurement screw into the measurement screw hole; a parameter acquisition step of acquiring parameters in the screwing step; an axial force measurement step of measuring the axial force of the measurement screw applied between the bearing surface and the screw hole member by the axial force measuring device; a bottom-touching-determination step of determining the presence or absence of bottom-touching on the basis of the axial force; and a determination standard setting step of setting a bottom-touching-determination standard based on the parameters by collating the determination result in the bottom-touching-determination step with the parameters acquired in the parameter acquisition step.

Effect

According to the method for setting bottom-touching-determination standard according to one aspect of the disclosure, the bottom-touching-determination standard based on parameters can be set with high reliability.

Figure 3:
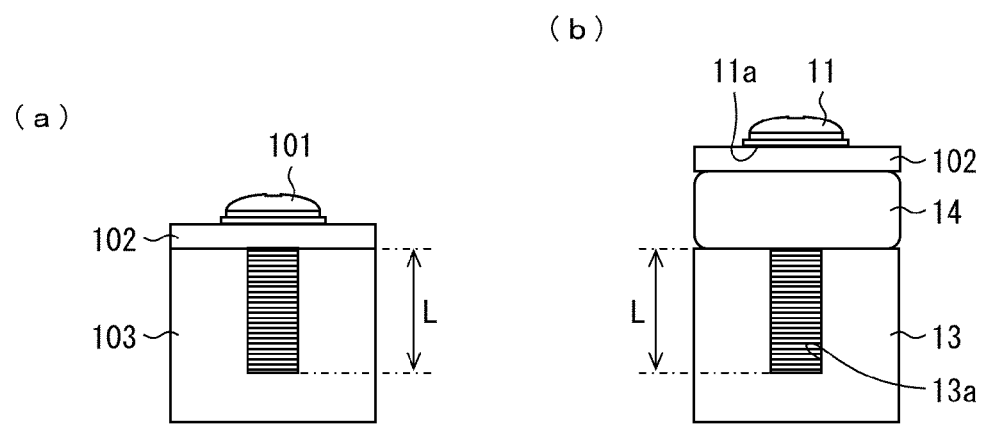

(a) and (b) of FIG. 3 are diagrams for illustrating the outline of the method for setting bottom-touching-determination standard according to the present embodiment.

Figure 4:
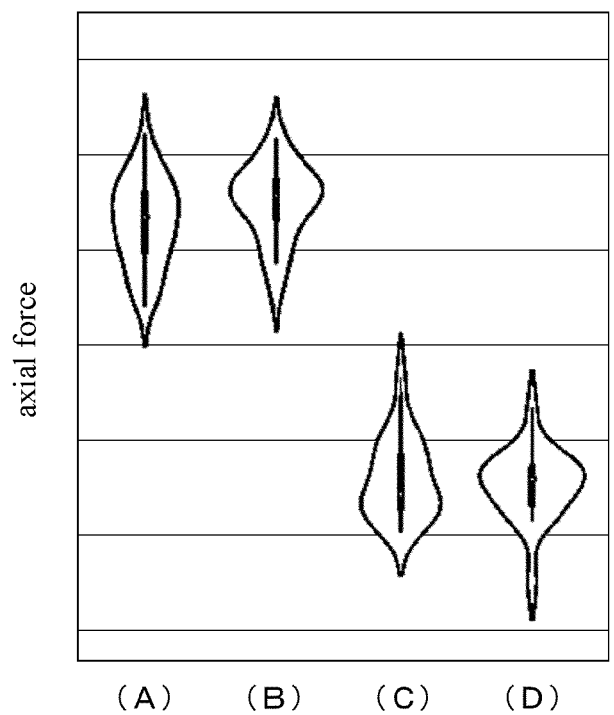

FIG. 4 is a graph showing the results of measuring axial forces with load cells for four types of screws.

Figure 5:
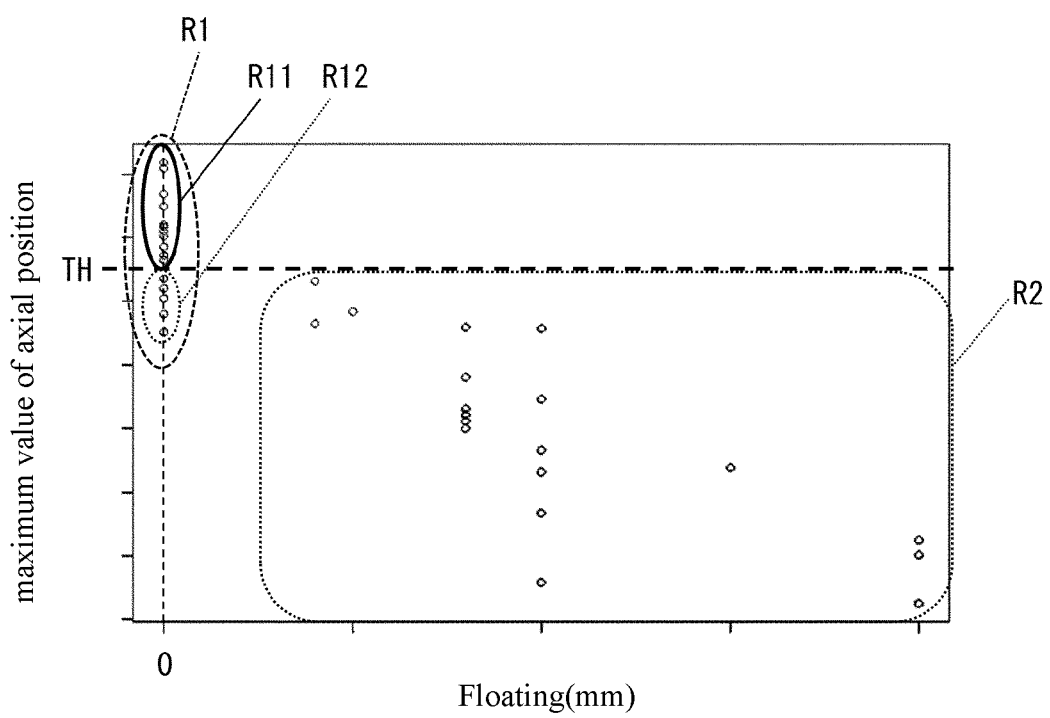

FIG. 5 is a graph showing an example of setting a bottom-touching-determination standard by the method for setting bottom-touching-determination standard according to the present embodiment.

Figures 6, 7:
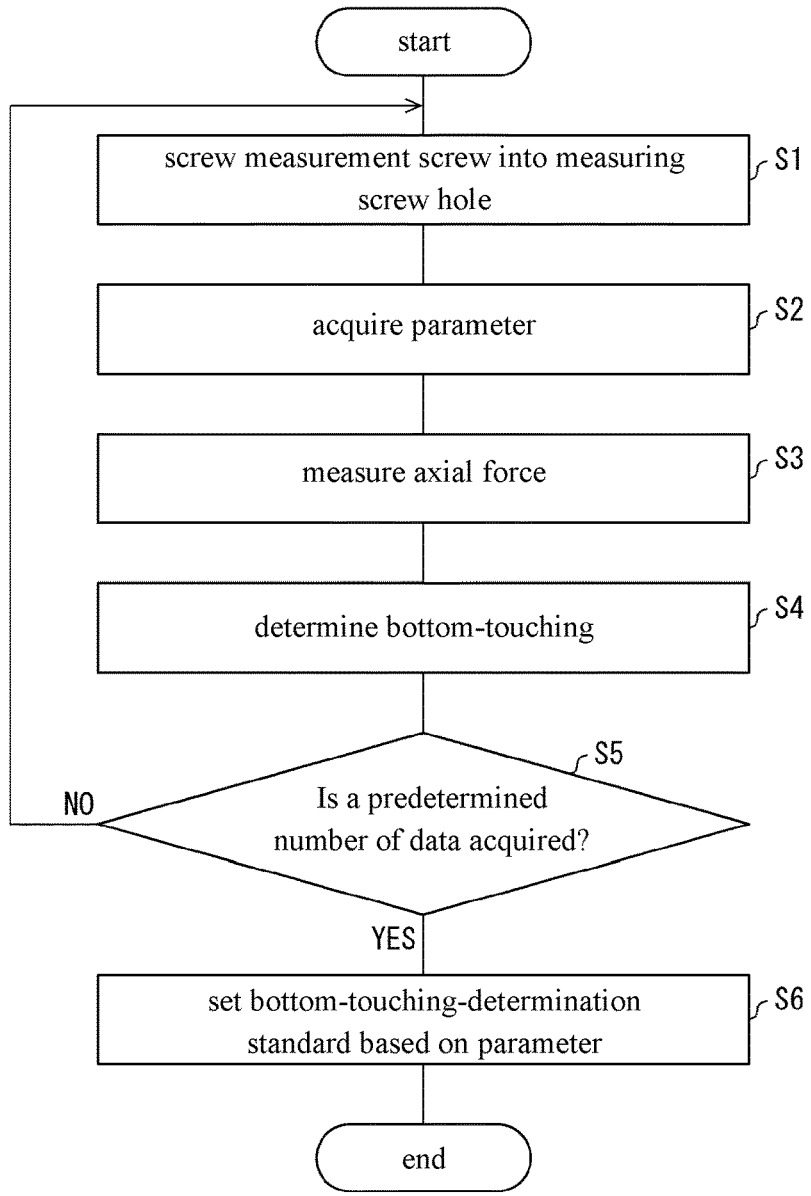

FIG. 6 is a flowchart showing processing in the method for setting bottom-touching-determination standard according to the present embodiment.

FIG. 7 is a diagram showing an example of a table referred to by a standard setting device.

DESCRIPTION OF THE EMBODIMENTS

Hereinafter, an embodiment according to one aspect of the disclosure (hereinafter, also referred to as "the present embodiment") is described with reference to the drawings.

§ 1 Application Example

Figure 2:
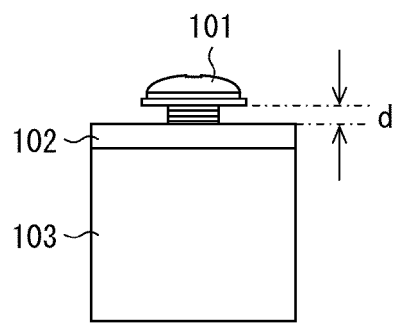
FIG. 2 is a diagram showing an example of the state of a screw-tightened fastening screw, in which (a) is a diagram showing the state in which the bearing surface is floating from the object to be fastened, and (b) is a diagram showing the state in which the bearing surface is in contact with the object to be fastened.
Figure 2:
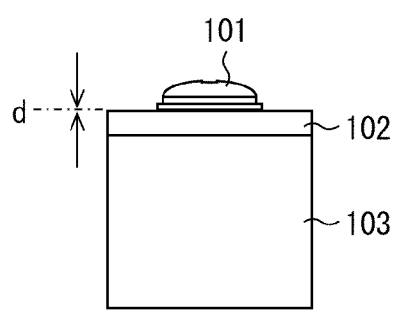

FIG. 2 is a diagram showing an example of the state in which an object to be fastened 102 is fastened to a fastening object 103 by a fastening screw 101, in which (a) is a diagram showing the state in which the bearing surface is floating from the object to be fastened 102, and (b) is a diagram showing the state in which the bearing surface is in contact with the object to be fastened 102.

During screw tightening, if a screw that is longer than the screw that should be used is accidentally used, if the screw hole is shallow, or if foreign matter has entered the screw hole, a defect called bottom-touching may occur, that is, the front end of the screw may come into contact with the bottom of the screw hole during screw tightening. When such a defect occurs, the screw does not exert a sufficient fastening force even though a specified torque is applied by the front end of the screw reaching the bottom of the screw hole.

As shown in (a) of FIG. 2, if the bearing surface of the fastening screw 101 is not in contact with the object to be fastened 102, the distance d between the bearing surface and the object to be fastened 102 can be measured. In this way, if the distance d can be measured, it can be determined that bottom-touching has occurred. On the other hand, as shown in (b) of FIG. 2, bottom-touching may occur even when the bearing surface of the fastening screw 101 is in contact with the object to be fastened 102. However, in the state shown in (b) of FIG. 2, the presence or absence of bottom-touching cannot be determined depending on the distance d.

(a) and (b) of FIG. 3 are diagrams for illustrating the outline of the method for setting bottom-touching-determination standard according to the present embodiment. In the present embodiment, as shown in (a) of FIG. 3, measurement is made on the axial force of the fastening screw 101 in a state that the fastening screw 101 is screwed into the fastening object 103 by a length L and the object to be fastened 102 is fastened to the fastening object 103. However, when the fastening screw 101 actually fastens the object to be fastened 102 to the fastening object 103, it is necessary to use an expensive device such as an ultrasonic sensor to measure the axial force. In addition, because the ultrasonic sensor does not directly measure the axial force, the measurement precision may be lowered.

In the present embodiment, as shown in (b) of FIG. 3, the axial force in the state that the object to be fastened 102 is fastened to a screw hole member 13 by a measurement screw 11 is measured by a load cell 14 (axial force measuring device) arranged between the object to be fastened 102 and the screw hole member 13. The screw hole member 13 has a measurement screw hole 13a having a predetermined depth. The load cell 14 measures the compressive force applied between the bearing surface 11a of the measurement screw 11 screwed into the measurement screw hole 13a and the screw hole member 13. According to the method shown in (b) of FIG. 3, the compressive force applied between the bearing surface 11a of the measurement screw 11 and the screw hole member 13, that is, the axial force can be directly measured, so that highly precise measurement can be performed.

FIG. 4 is a graph showing the results of measuring the axial force by the load cell 14 for four types of screws. In the graph shown in FIG. 4, the vertical axis indicates the axial force, and the horizontal axis indicates the distribution (probability density) when the measurement is performed a plurality of times. In FIG. 4, the following axial forces are shown in order from the left.

(A) The axial force of the measurement screw 11 as a sample, which is known to have sufficient fastening force (B) The axial force (1) of the screw of which the bearing surface is in contact with the object to be fastened as a result of screw tightening (C) The axial force (2) of the screw of which the bearing surface is in contact with the object to be fastened as a result of screw tightening (D) The axial force of the screw of which the bearing surface is not in contact with the object to be fastened as a result of screw tightening In the method for setting bottom-touching-determination standard according to the present embodiment, among the four types of graphs shown in FIG. 4, for the axial force of the screw having the axial force as shown in the graphs (A) or (B), it is determined that no bottom-touching occurs. On the other hand, for the axial force of the screw having the axial force as shown in the graph of (C) or (D), it is determined that bottom-touching occurs.

Because the bearing surface is in contact with the object to be fastened for the axial force of the screw in the case of both (B) and (C), it is not possible to determine the presence or absence of bottom-touching by the distance d between the bearing surface and the object to be fastened. However, by determining the presence or absence of bottom-touching on the basis of the axial force, as described above, it can be determined that the screw having the axial force of (B) has no bottom-touching and the screw having the axial force of (C) has bottom-touching.

In the method of setting bottom-touching-determination standard according to the present embodiment, an attempt is made to set the bottom-touching-determination standard based on parameters in screw tightening by collating the parameters with the presence or absence of bottom-touching determined on the basis of the axial force. Then, depending on whether or not the bottom-touching-determination standard can be set, it is determined whether or not the parameters are appropriate as the parameters for determining the presence or absence of bottom-touching.

§ 2 Configuration Example

Figure 1:
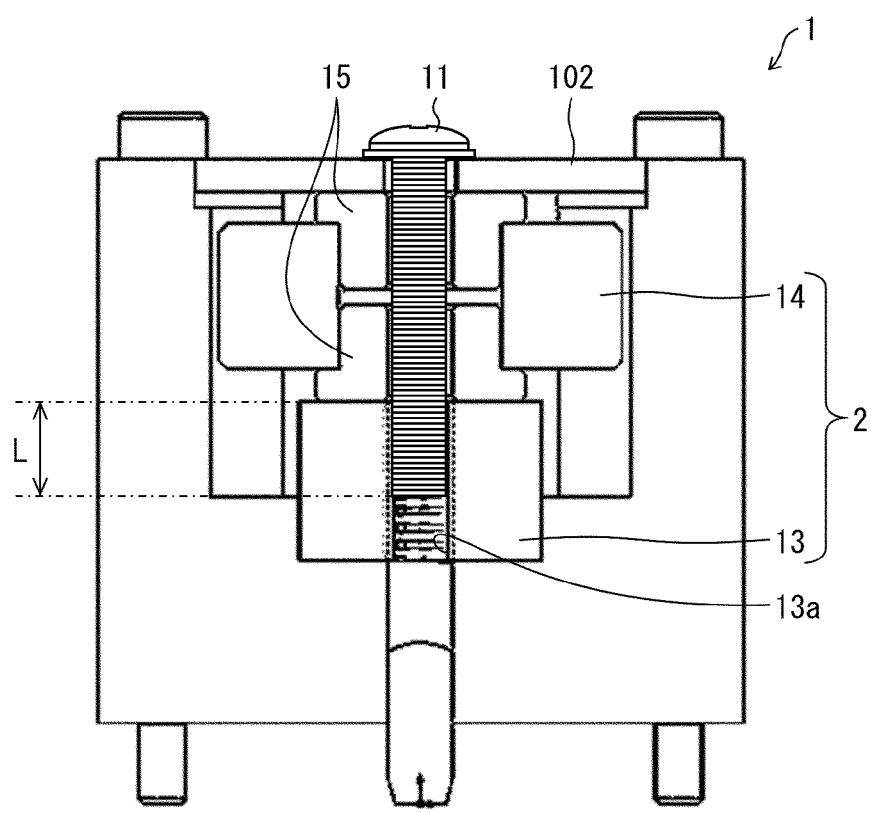
FIG. 1 is a diagram showing an example of a standard setting system for executing a method for setting bottom-touching-determination standard according to the present embodiment.

FIG. 1 is a diagram showing an example of a standard setting system 1 for executing the method for setting bottom-touching-determination standard according to the present embodiment. As shown in FIG. 1, the standard setting system 1 includes the measurement screw 11, the object to be fastened 102, a measuring system 2, and a flanged washer 15. In addition, the standard setting system 1 further includes a standard setting device (not shown) for setting a standard for parameters, and a screw tightening device (not shown) for tightening the measurement screw 11. The measuring system 2 includes the screw hole member 13 and the load cell 14 described above.

The flanged washer 15 is an annular member arranged above and below the load cell 14 while surrounding the measurement screw 11. Therefore, the load cell 14 abuts against the object to be fastened 102 via the flanged washer 15 arranged on the upper side, and abuts against the screw hole member 13 via the flanged washer 15 arranged on the lower side.

The measurement screw 11 is longer than the fastening screw 101 by the thickness of the load cell 14 and the flanged washer 15. In addition, the length L at which the measurement screw 11 is screwed into the screw hole member 13 is equal to the length L at which the fastening screw 101 is screwed into the fastening object 103. Therefore, the parameters in the screw tightening process of the measurement screw 11 and the axial force at the completion of screw tightening are equal to the parameters in the screw tightening process of the fastening screw 101 and the axial force at the completion of screw tightening, respectively.

The screw tightening device performs screw tightening in which the measurement screw 11 is screwed into the measurement screw hole 13a. The screw tightening device is controlled by the standard setting device. The standard setting device executes the method for setting bottom-touching-determination standard that sets a standard for determining bottom-touching in screw tightening.

§ 3 Operation Example

FIG. 5 is a graph showing an example in which the bottom-touching-determination standard is set by the method for setting bottom-touching-determination standard according to the present embodiment. In the example shown in FIG. 5, the maximum value of the position of the driver in the axial direction is used as a parameter for setting the standard. In FIG. 5, the horizontal axis shows the floating of the bearing surface of the measurement screw 11 from the object to be fastened 102, and the vertical axis shows the maximum value of the position of the driver in the axial direction in the screw tightening process. In the following description, the floating of the bearing surface of the measurement screw 11 from the object to be fastened 102 may be simply referred to as "floating of the bearing surface". In addition, in the graph shown in FIG. 5, the region where the data points exist is divided into regions R1 and R2. Furthermore, the region R1 is divided into regions R11 and R12.

The region R2 is a region including all data points whose bearing surface floating is larger than 0 mm. Bottom-touching occurred in all the screws with data points in the region R2.

The region R1 is a region including all the data points where the floating of the bearing surface is 0 mm. Of the screws whose data points are included in the region R1, no bottom-touching occurred in the screws whose data points are included in the region R11. On the other hand, bottom-touching occurred in all the screws whose data points are included in the region R12.

The regions R11 and R12 are divided with the threshold value TH as a boundary for the maximum value of the position of the driver in the axial direction. In addition, the maximum values of the position of the driver in the axial direction for the data points included in the region R2 are all less than the threshold value TH. Therefore, it is possible to determine whether or not the screw has a fastening force depending on whether or not the maximum value of the position of the driver in the axial direction is equal to or greater than the threshold value TH. That is, the standard setting device can set the threshold value TH as the bottom-touching-determination standard for the maximum value of the position of the driver in the axial direction.

In addition to the maximum value of the position of the driver in the axial direction, for the average value or the minimum value of the position, the standard setting device may also set the bottom-touching-determination standard according to the method for setting bottom-touching-determination standard of the present embodiment as a parameter for making a determination in view of the axial force in screw tightening. In addition, the standard setting device may set the bottom-touching-determination standard as a parameter for making a determination in view of the axial force in screw tightening for the average value, the maximum value, or the minimum value of the moving speed, the rotation speed, or the rotation amount in the axial direction of the driver.

Moreover, depending on the type of the parameter, it may not be possible to set a bottom-touching-determination standard such as the threshold value TH. In that case, the standard setting device evaluates that the parameter is not appropriate as a parameter for determining whether or not the screw has bottomed touch.

FIG. 6 is a flowchart showing the processing in the method for setting bottom-touching-determination standard according to the present embodiment. First, in the standard setting device, the measurement screw 11 is screwed into the measurement screw hole 13a by the screw tightening device (S1, screwing step). Next, the standard setting device acquires the parameters in the screw tightening process (S2, parameter acquisition step). Subsequently, the standard setting device measures, by the load cell 14, the axial force of the measurement screw 11 applied between the bearing surface of the measurement screw 11 and the screw hole member 13 (S3, axial force measurement step). Furthermore, the standard setting device determines the presence or absence of bottom-touching on the basis of the measured axial force (S4, bottom-touching-determination step).

The standard setting device then determines whether the parameter acquisition and bottom-touching measurement have been performed on a given number of screws (S5). When the acquisition of parameters and the measurement of bottom-touching are performed for a predetermined number of screws (YES in S5), the standard setting device collates the determination result in the bottom-touching-determination step with the parameters and thereby sets the bottom-touching-determination standard based on parameters (S6, determination standard setting step). On the other hand, if the parameter acquisition and bottom-touching measurement have not been performed for a given number of screws (NO in S5), the standard setting device again performs steps S1 through S4 for the other screws. As for the predetermined number, an appropriate number may be appropriately set by the user of the standard setting device for setting the determination standard, and may be 35 for example.

According to the method for setting bottom-touching-determination standard according to the present embodiment, the standard setting device can set the bottom-touching-determination standard based on parameters with high reliability.

FIG. 7 is a diagram showing an example of a table referred to by the standard setting device. In the bottom-touching-determination step described above, the standard setting device determines the presence or absence of bottom-touching by referring to the table showing the relationship between the length at which the measurement screw 11 is screwed into the measurement screw hole 13a and the range of the axial force for determining that bottom-touching has not occurred. In FIG. 7, it is shown that when the length at which the measurement screw 11 is screwed into the measurement screw hole 13a is L1, the lower limit of the axial force for determining that bottom-touching has not occurred is F1, that is, the range of the axial force for determining that bottom-touching has not occurred is F1 or more. Similarly, it is shown that when the length at which the measurement screw 11 is screwed into the measurement screw hole 13a is L2, the lower limit of the axial force for determining that bottom-touching has not occurred is F2, that is, the range of the axial force for determining that no bottom-touching has occurred is F2 or more.

The axial force due to the fastening of the screw changes according to the length at which the screw is screwed into the screw hole. The standard setting device can refer to the table as shown in FIG. 7 to determine the presence or absence of bottom-touching, and thereby determine the bottom-touching corresponding to the length at which the screw is screwed into the screw hole. In the table, because the range of the axial force in which it can be determined that the bottom-touching has not occurred is taken into consideration, the influence of the variation of the axial force on the determination of the presence or absence of the bottom-touching can be reduced.

§ 4 Modification Example

The standard setting device of the standard setting system 1 may be realized by a logic circuit (hardware) formed in an integrated circuit (IC chip) or the like, or may be realized by software.

In the latter case, the standard setting system 1 includes a computer that executes the instructions of a program that is software for realizing each function. The computer includes, for example, one or more processors and a computer-readable recording medium in which the above program is stored. Then, in the computer, the processor reads the program from the recording medium and executes the program, thereby achieving the object of the disclosure. As the processor, for example, a central processing unit (CPU) can be used. As the recording medium, a "non-temporary tangible medium", for example, a read only memory (ROM) or the like, a tape, a disk, a card, a semiconductor memory, a programmable logic circuit, or the like can be used. In addition, a random access memory (RAM) for expanding the above program may be further included. In addition, the program may be supplied to the computer via an arbitrary transmission medium (communication network, broadcast wave, etc.) capable of transmitting the program. Moreover, one aspect of the disclosure can also be realized in the form of a data signal embedded in a carrier wave, in which the above program is embodied by electronic transmission.

The disclosure is not limited to the above-described embodiments, and various modifications can be made within the scope of the claims. The embodiments obtained by appropriately combining the technical means disclosed in different embodiments are also included in the technical scope of the disclosure.

SUMMARY

As described above, the method for setting bottom-touching-determination standard according to one aspect of the disclosure sets a standard for determining bottom-touching in screw tightening. In the method, a measuring system is used which includes a screw hole member having a measurement screw hole of a predetermined depth and an axial force measuring device that measures a compressive force applied between the screw hole member and a bearing surface of a measurement screw screwed into the measurement screw hole. The method includes: a screwing step of screwing the measurement screw into the measurement screw hole; a parameter acquisition step of acquiring parameters in the screwing step; an axial force measurement step of measuring the axial force of the measurement screw applied between the bearing surface and the screw hole member by the axial force measuring device; a bottom-touching-determination step of determining the presence or absence of bottom-touching on the basis of the axial force; and a determination standard setting step of setting a bottom-touching-determination standard based on the parameters by collating the determination result in the bottom-touching-determination step with the parameters acquired in the parameter acquisition step.

According to the above configuration, first, the parameters in the screwing step of screwing the measurement screw into the measurement screw hole are acquired. In addition, the presence or absence of bottom-touching is determined on the basis of the axial force of the measurement screw applied between the bearing surface of the measurement screw and the screw hole member.

Here, because the axial force is measured by measuring the compressive force applied between the bearing surface of the measurement screw and the screw hole member, highly precise measurement can be performed. The bottom-touching-determination is performed on the basis of the highly precise axial force measurement result, and the bottom-touching-determination standard based on parameters is set by collating the determination result with the parameters. The bottom-touching-determination based on parameters for which the bottom-touching-determination standard is set as described above can be evaluated as having high reliability. Therefore, the bottom-touching-determination standard based on parameters can be set with high reliability.

Further, in the method for setting bottom-touching-determination standard according to one aspect of the disclosure, in the bottom-touching-determination step, the presence or absence of bottom-touching is determined by referring to the table showing the relationship between the length at which the measurement screw is screwed into the measurement screw hole and the range of the axial force in which it can be determined that bottom-touching has not occurred.

The axial force due to the fastening of the screw changes according to the length at which the screw is screwed into the screw hole when the conditions such as the material of the screw and the friction coefficient of the bearing surface are the same. In view of this, according to the above configuration, it is possible to perform bottom-touching-determination corresponding to the length at which the screw is screwed into the screw hole. Because the range of the axial force in which it can be determined that the bottom-touching has not occurred is taken into consideration, the influence of the variation in the axial force on the determination of the presence or absence of bottom-touching can be reduced.

In addition, the program according to one aspect of the disclosure causes a computer to execute the parameter acquisition step, the axial force measurement step, the bottom-touching-determination step, and the determination standard setting step.

What is claimed is:

1. A method for setting bottom-touching-determination standard which sets a standard for determining bottom-touching in screw tightening, wherein a measuring system is used which comprises a screw hole member having a measurement screw hole of a predetermined depth and an axial force measuring device that measures a compressive force applied between the screw hole member and a bearing surface of a measurement screw screwed into the measurement screw hole, and the method for setting bottom-touching-determination standard comprises:

a screwing step of screwing the measurement screw into the measurement screw hole;

a parameter acquisition step of acquiring parameters in the screwing step;

an axial force measurement step of measuring the axial force of the measurement screw applied between the bearing surface and the screw hole member by the axial force measuring device;

a bottom-touching-determination step of determining the presence or absence of bottom-touching on the basis of the axial force; and a determination standard setting step of setting a bottom-touching-determination standard based on the parameters by collating a determination result in the bottom-touching-determination step with the parameters acquired in the parameter acquisition step.

2. The method for setting bottom-touching-determination standard according to claim 1, wherein in the bottom-touching-determination step, the presence or absence of bottom-touching is determined by referring to a table showing the relationship between a length at which the measurement screw is screwed into the measurement screw hole and a range of the axial force in which it is determined that bottom-touching has not occurred.

* * * * *